E. R. Stilwell,

Feed Water Heater.

No. 3618. Reissued Aug. 24. 1869

Inventor
E. R. Stilwell
by
Munn, Fenwick & Lawrence

Witnesses.
R. Thompkins
Julius Hirsch

N. PETERS, PHOTO-LITHOGRAPHER, WASHINGTON, D. C.

UNITED STATES PATENT OFFICE.

EDWIN R. STILWELL, OF DAYTON, OHIO.

IMPROVEMENT IN FEED-WATER HEATER AND FILTERER.

Specification forming part of Letters Patent No. 44,561, dated October 4, 1864; Reissue No. 2,159, dated January 23, 1866; Reissue No. 3,618, dated August 24, 1869.

*To all whom it may concern:*

Be it known that I, EDWIN R. STILLWELL, of Dayton, in the county of Montgomery and State of Ohio, have invented a new and Improved Mode of Heating and Purifying Water for Steam-Boilers; and I do hereby declare that the following is a full, clear, and exact description of division numbered 2,159, reference being had to the accompanying drawings, making a part of this specification, in which—

Figure 1:
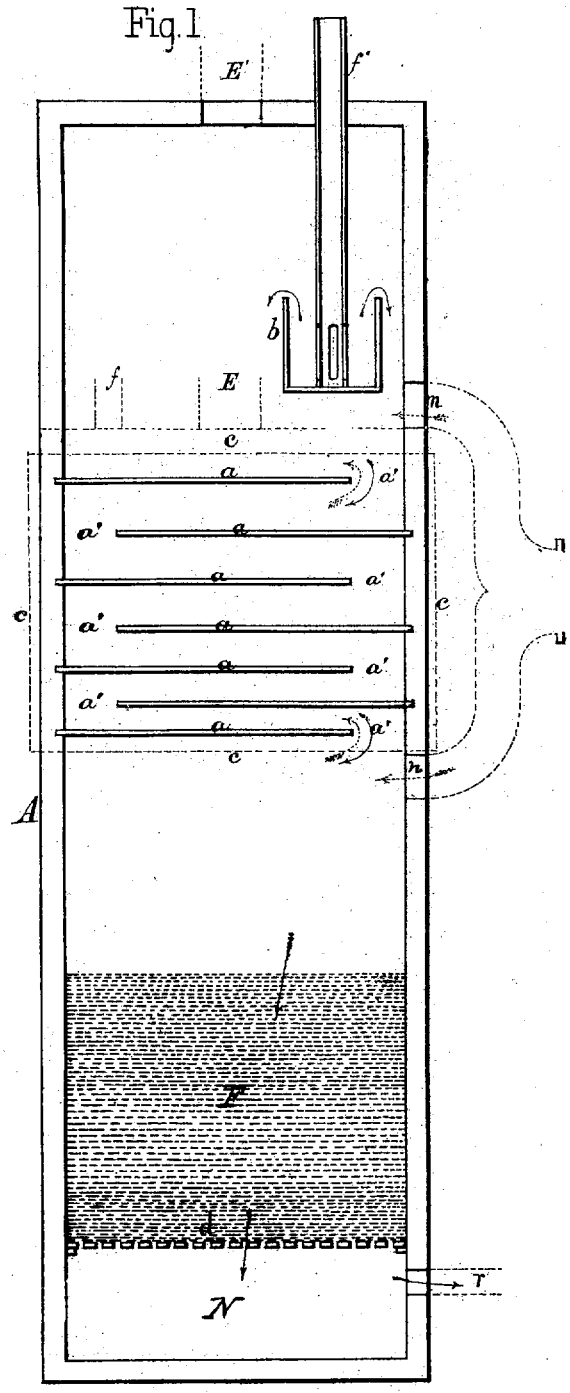
Figure 2:
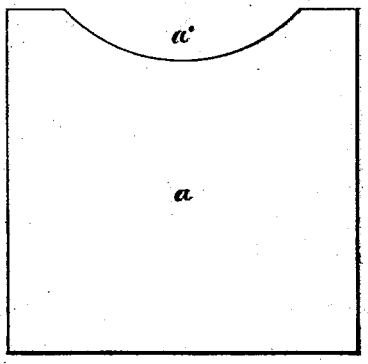

Figure 1 is a vertical section through my improved feed-water heater and purifier. Fig. 2 is a top view of one of the depositing-plates.

The object of this invention is to construct a feed-water-heating apparatus and also combine a filter therewith in such manner that after the water has been conducted in a thin sheet over a series of shelves presenting a large area of surface in a compact space, and after the water has been subjected to the heating action of steam and its crystallizable matters thereby deposited upon said shelves, the water is then conducted directly through filtering material and deprived of the more solid and less soluble particles, as will be hereinafter explained.

The following description will enable others skilled in the art to understand my invention and the best mode known to me for carrying it into effect.

In the accompanying drawings, A represents a tight vessel of suitable form, having arranged within it a number of plates or shelves, *a a*, having openings through their ends at *a′ a′*, so that water will flow from one shelf upon another through the entire series of shelves. These shelves are made removable, and a suitable opening is made through the vessel A, closed by a plate, (indicated by dotted lines *c*,) so that the shelves can be conveniently taken out of the vessel when it is desired to cleanse them of any deposit which may be upon them. Through the top of the vessel A pipes *f′* E′ are inserted. The pipe *f′* conducts the impure water into said vessel to be purified therein, and the pipe E′ conducts off the waste steam after it has acted upon the water.

Through the vertical side of the vessel A three openings, *m n r*, are made. The openings *m* and *n* allow steam to enter the vessel above and below the series of plates *a*, and the opening *r*, which leads from a chamber, N, arranged below filtering material F, is for the escape of the heated and filtered water.

The dotted curved lines on the right-hand side of Fig. 1 indicate branch pipes leading from one steam-pipe to the two inlet-passages *m* and *n*.

The grating or perforated plate *d* serves to support the filtering material F above the outlet-passage *r*.

From the above description it will be seen that after the impure water leaves the pipe *f′* it will fall upon the upper plate, *a*, of the series of plates, and thence flow in a zigzag course over the several plates *a a*, and finally fall upon or pass through the filtering material F and escape through pipe *r*. It will also be seen that the water will be subjected to the direct action of steam entering at *m* and *n*, and that the steam which enters at *n* will fill the chamber below the plates *a*, and then take an upward zigzag course between these plates, as indicated by the dotted arrows in Fig. 1, on its way to the escape-pipe E′. By this arrangement the water, as it falls from the pipe *f′*, will be crossed by the inflowing steam at orifice *m*, and as the water passes over the shelves in a thin sheet it will be subjected to the action of steam passing in an opposite direction through the spaces between the shelves or plates *a a*. In this way and by these means the crystallizable atoms in the water will be deposited upon the plates *a a* and the water will be considerably heated. After being thus treated the water will be deprived of its less soluble particles by the filtering material F, through which it is conducted on its way to the escape-pipe *r*.

Any suitable filtering material may be employed for separating the solid matters from the hot water, and this material should be arranged between the last or lowest one of the series of plates *a* and the exit-pipe or orifice *r* for the pure water.

If it is not desired to introduce steam through *m* above the series of plates, *m* may be dispensed with, and the water-inlet pipe and steam-outlet pipe may be arranged as indicated by the dotted lines *f* and E, Fig. 1.

Under this reissue patent I do not claim the overflow-box *b* at the lower end of water-inlet pipe *f′*; nor do I claim the arrangement of the steam pipe or inlet *m* with relation to the said overflow-box or water-inlet pipe, as these features form the subject of my reissue Patent numbered 2,160, dated January 23, 1866.

It is obvious that the different parts of the apparatus may be changed in form and location without departing from the principle of my invention or the elements constituting its novelty; but believing the plan represented to be the best, and Having described my invention, what I claim as new, and desire to secure by Letters Patent, is—

1. Filtering material F between a series of shelves and an outlet, *r*, substantially as described.

2. The arrangement of steam-inlet *n*, shelves *a a*, filtering material F, and outlet *r* in a vessel A, substantially as described.

3. The depositing-plates *a a a*, constructed and arranged substantially as described.

4. The arrangement of the steam-pipes *m* and *n* with reference to the plates *a a a*, substantially as specified.

5. The combination of the vessel A, the plates *a a a*, the plate *d*, the steam-pipes *m*, *n*, and E, and water-pipes *f'* and *r*, substantially as described.

EDWIN R. STILWELL.

Witnesses:
CHAS. F. SNYDER,
THOS. D. MITCHELL.